United States Patent [19]

Hopkinson et al.

[11] Patent Number: 4,980,789

[45] Date of Patent: Dec. 25, 1990

[54] TWO-STAGE GAPPED SURGE ARRESTER

[75] Inventors: Phillip J. Hopkinson, Zanesville, Ohio; Stephen D. Smith, Nacogdoches, Tex.; George W. Mayall, deceased, late of Zanesville, Ohio, by Martha M. Mayall, administratrix

[73] Assignee: Cooper Industries, Inc., Houston, Tex.

[21] Appl. No.: 306,713

[22] Filed: Feb. 3, 1989

Related U.S. Application Data

[63] Continuation-in-part of Ser. No. 164,652, Mar. 7, 1988, abandoned.

[51] Int. Cl.[5] .............................................. H02H 9/06

[52] U.S. Cl. ........................................ 361/35; 361/38; 361/39; 361/126

[58] Field of Search ....................... 361/35, 38, 39, 40, 361/111, 117, 126, 120, 130

[56] References Cited

U.S. PATENT DOCUMENTS

| | | | |
|---|---|---|---|
| 1,274,428 | 8/1918 | Lee . | |
| 1,310,054 | 7/1919 | Brown . | |
| 2,018,672 | 10/1935 | Hill | 175/30 |
| 2,172,640 | 9/1939 | Nelson | 175/294 |
| 2,866,135 | 12/1958 | Cunningham | 317/15 |
| 2,993,146 | 7/1961 | Winter | 317/15 |
| 3,515,934 | 6/1970 | Kershaw | 361/128 |
| 4,320,432 | 3/1982 | Dunke | 361/39 |
| 4,604,673 | 8/1986 | Schoendube | 361/38 |

OTHER PUBLICATIONS

TMX-703-B L. V. Bushing Assemably Dwg., dated 6/57 by Line Material Co.

*Primary Examiner*—Todd E. DeBoer

*Attorney, Agent, or Firm*—Gregory L. Maag; David A. Rose; Ned L. Conley

[57] ABSTRACT

A two-stage gapped low voltage surge arrester for dissipating transformer secondary side current surges includes an arc strap in series with a resistive grommet. The combination is mounted on the grounded transformer housing adjacent a line potential bushing such that a first spark gap is formed between the bushing stud and arc strap. The resistive grommet is grounded to the transformer ground pad by metallic fasteners such that a second spark gap is formed in parallel with the resistive grommet. Surges entering the transformer secondary winding of sufficient magnitude induce the first spark gap to flash over, shunting potentially damaging currents outside the transformer through the arc strap and resistive grommet. At even higher currents, the voltage across the resistive grommet exceeds the flash over voltage of the second spark gap and shunts the surge around the resistive grommet.

33 Claims, 4 Drawing Sheets

TWO-STAGE GAPPED SURGE ARRESTER

RELATED APPLICATION

This application is a continuation-in-part of U.S. application Ser. No. 164,652, filed Mar. 7, 1988 now abandoned.

BACKGROUND OF THE INVENTION

The present invention relates to electric transformers, especially distribution transformers and the protective equipment therefor. More particularly, the invention relates to apparatus for protecting low-voltage distribution transformers from damage due to current surges entering the secondary windings of the transformer. Still more particularly, the invention relates to a low-voltage, two-stage gapped surge arrester.

Distribution transformers convert electrical energy from primary, high voltage levels, such as 2.4 to 34.5 KV, to secondary, low voltage levels, low voltage being defined as 1200 volts and less. Most typically, secondary side voltage levels of distribution transformers are 120/240 volts or 240/480 volts. Distribution transformers include primary and secondary windings which are enclosed in a protective metallic housing. A dual secondary voltage, such as 120/240 volts, is achieved by constructing the transformer secondary winding in two halves or sections. One end of each of the two winding sections is electrically joined to the other and typically grounded at this point of interconnection. In this configuration, when the transformer is energized, the voltage between the grounded interconnection point and each ungrounded winding end will be the same, i.e., 120 volts, and will be equal to one half the voltage between the two ungrounded ends, i.e., 240 volts.

Connection to the transformer windings is made at the transformer terminals, termed bushings. Bushings for both the primary and secondary terminals are usually of the stud type, the stud comprising a conducting bar or rod electrically connected to the internal windings and extending through the protective metallic housing. An insulating material surrounds the stud where it passes through the housing to insulate the stud from the housing. The studs have provisions for the mechanical connection to line wires. Bushings are usually located on the side of the transformer housing, except that primary bushings for 7.2 KV and higher service are usually mounted on the cover or top of the housing. The primary or high voltage terminals of distribution transformers are conventionally designated as the $H_1$ and $H_2$ bushings. The low voltage or secondary side line-potential terminals are designated as X1 and X3, while the low voltage neutral bushing is designated as X2.

The majority of distribution transformers are designed for pole mounting; however, some are built for pad or platform mounting. Distribution transformers of both types are susceptible to damage from lightning induced surges entering their windings. When a lightning surge occurs, the voltage appearing across the primary winding may exceed the insulation strength of the winding, resulting in a flash-over across or through the winding insulation, thereby causing the transformer to fail. It has been conventional practice to provide lightning protection for distribution transformers by means of lightning arresters applied to the primary, high voltage winding. More specifically, in the case of single phase distribution transformers in which both primary bushings $H_1$ and $H_2$ are at line potential, lightning arresters have typically been connected between $H_1$ and ground and between $H_2$ and ground. In applications in which primary bushing $H_1$ is at line potential and $H_2$ is grounded, it is common to connect a single lightning arrester between $H_1$ and grounded $H_2$. The lightning arrester's function is to provide a path by which lightning induced current readily finds its way to ground without flashing over insulation of the transformer's winding.

Investigations have been made in recent years concerning lightning induced failures of common designs of overhead and pad mounted distribution transformers. These investigations revealed that despite the presence of state-of-the-art primary-side lightning protection as described above, many such transformer failures are attributable to lightning surges entering the transformer via the normally unprotected low voltage terminals, causing failure of the high voltage winding due to the induced voltages. While lightning induced currents entering the low voltage bushings are normally nondestructive, current surges over 5,000 amps are not uncommon. Secondary surges in the order of 3,000 amps can result in potentially destructive induced voltages in the primary winding which may cause the transformer to fail. Thus, it has been determined that primary side arrester protection of the high voltage winding is ineffective in preventing transformer damage caused by secondary side current injection.

Surge currents can enter the low-voltage or secondary terminals of a distribution transformer in three basic ways. The first and most obvious way is due to direct lightning strikes on secondary service conductors. In this case, surge currents are forced through the transformer secondary windings on their way to ground at the transformer neutral X2. This mode of current surge may involve only one half, or the entire secondary winding.

A second possible mode of surge current injection into the low voltage windings of a distribution transformer is due to lightning discharge into the ground near a secondary service point. Such a discharge can cause a local elevation of ground potential resulting in ground currents flowing outward from the discharge point back toward the transformer's grounded neutral X2. Some of this current can flow through the transformer secondary windings via the grounded transformer neutral resulting in a low-side current surge.

The third way that current surges enter low-voltage windings may be less obvious than the others, but is perhaps the most common in occurrence. Lightning strikes to overhead primary-side phase conductors are conducted to ground at the service pole supporting the transformer by a ground wire running down the pole. The lightning arrester connected to the primary winding of the distribution transformer forms one path for the surge from the phase conductor to flow to this ground connection. Where there is an overhead neutral conductor, it is connected directly to the pole ground and it too will conduct surge currents through the ground wire. Since the transformer neutral X2 is also connected to this ground wire, part of the current discharged on the primary side can be diverted into the secondary winding of the transformer.

In each of the last two cases, surge current may enter the grounded neutral terminal X2 of the low-voltage winding and divide through the two halves of the winding, exiting by way of secondary line terminals X1 or X3, or both. For such current to flow through the transformer, there must be a path through the customer load or customer meter gaps, or across gaps in the customer's wiring. Where such a path exists, the amount of surge current conducted through the transformer secondary windings will be dependent both on the amount of customer load connected at the time of the surge and, more significantly, on the ratio of the resistance of the pole ground to the resistance of the customer ground. If the pole ground has a resistance less than that of the customer ground, the current level within the transformer should be well below that required to produce an insulation failure within the windings.

Three-wire surge injection occurs where a surge enters the transformer through X2 and departs from the transformer through both X1 and X3. Two-wire surge injection occurs in two situations. First, it may occur when the surge enters the transformer through X2 and departs from the transformer through either X1 or X3. This can occur when only one customer meter gap fires, or when the load on the service conductor connected to X1 is substantially different from that on X3. Two-wire injection may also occur when a surge enters either X1 or X3 and exits to ground through X2.

Depending upon their design, distribution transformers tend to be particularly affected by certain types of surges. More specifically, transformers having uncompensated winding constructions, i.e., noninterlaced low voltage windings, are particularly affected by both three-wire and two-wire surge injection. Transformers having compensated winding constructions, i.e., interlaced low voltage windings, are only affected by two-wire surge injection. The majority of modern day distribution transformers have noninterlaced low voltage windings, and thus are particularly susceptible to damage from both three-wire and two-wire surge injection.

In an effort to protect distribution transformers from such secondary-side surges, various schemes have been employed. First, constructing the transformers with interlaced secondary windings provides good protection from three-wire surges, but, as explained above, two of the most common types of secondary surges result in two-wire surge injection and interlaced windings offer no protection from such surges. Further, transformers having interlaced windings also are more expensive than those with noninterlaced windings.

Alternatively, or additionally, extra primary winding insulation may be added to provide some protection from both two and three-wire surge injection. This technique is relatively expensive, however, and does not prevent surges from entering the transformer, but merely serves to raise the damage threshold level of the transformer.

Recently, surge arresters of the metal oxide varister (MOV) type have been applied between secondary-side phase terminals, X1 and X3, and the grounded neutral terminal, X2. This has been shown to provide adequate two and three-wire surge protection, but the MOV arresters are expensive and, since they are typically mounted within the transformer housing, they are not visible to workers. Thus, workers cannot determine from a simple visual inspection whether the transformer is protected by secondary side MOV arresters or whether the arresters are still functional. Furthermore, the MOV arresters have relatively less clamping action for high energy surges due to the voltage drop across the impedance of their interconnecting leads.

Accordingly, there remains a need in the art for a low voltage surge arrester capable of protecting a distribution transformer from damage or destruction caused by surge currents entering the secondary windings. Preferably, such an arrester would be effective against both two and three-wire surge injection, and would be reliable and inexpensive and provide tight clamping of high energy surges. One means by which this end may be accomplished is to design a low voltage arrester employing spark gap technology.

SUMMARY OF THE INVENTION

According to the present invention, there is provided a two-stage gapped surge arrester electrically in parallel with each section of the secondary winding of a distribution transformer. The invention diverts secondary side surge currents outside the secondary winding through a conductive path formed by a first spark gap and series resistor. Shunting the surge currents in this manner reduces the overvoltage appearing across the secondary winding section, and also reduces the voltage of greater magnitude which is induced within the primary winding and which could otherwise damage or destroy the transformer. The invention also includes a second spark gap in parallel with the series resistor for shunting high magnitude surge currents around the series resistor.

The invention further includes an arc strap having one end mounted adjacent to the bushing stud of a line potential secondary terminal, thereby forming the first spark gap between the stud and the arc strap.

The series resistor comprises a generally rectangular-shaped resistive grommet having a channel or groove formed in each side. The channel formed in the grommet defines a rectangular-shaped inner grommet core. An axial bore is formed through the grommet core.

The arc strap may include a pair of clevis shaped legs formed at the end opposite the first spark gap. In this embodiment, the arc strap legs straddle the grommet core. The grommet and arc strap are secured to a ground pad on the transformer enclosure by a ground bolt and washer, the shank portion of the ground bolt being disposed through the axial bores formed in the washer and resistive grommet and threadedly engaging the ground pad. A set of second spark gaps is formed in parallel with the resistive grommet, the set including the gaps between the arc strap legs and the conducting surfaces of the washer, and the gaps between the arc strap legs and the ground pad.

The invention may alternatively include a legless arc strap having an aperture formed in the end opposite the first spark gap, and having a metallic eyelet disposed within the aperture. The eyelet is secured within the arc strap aperture by the resistive grommet which is molded between the eyelet and the arc strap thereby forming a composite gap assembly which is secured and grounded to the transformer by a ground bolt and washer. In this embodiment, the second spark gaps are again formed between the arc strap and the washer and between the arc strap and the ground pad.

When lightning or another system disturbance creates a potentially damaging surge on the transformer secondary, the voltage across the first spark gap will increase until it reaches its spark over level. When the first spark gap fires, the surge current is shunted outside the secondary winding through the conductive path formed by the arc strap, the resistive grommet and the transformer ground pad. As the transient dissipates, the resistance provided by the grommet will limit the power-follow current and cause the arc across the first spark gap to extinguish. When high magnitude surge currents are diverted around the secondary windings and conducted through the arc strap and resistive grommet, the voltage across a second spark gap may exceed that gap's spark over voltage, at which point, the second gap fires and the surge current is shunted around the resistive grommet so as to more quickly dissipate the surge's energy before damage can occur to the transformer. As the surge current decreases, the arc across the second gap will extinguish and, subsequently, the resistance provided by the grommet will limit the power-follow current and cause the arc across the first gap to extinguish.

It is an object of this invention to provide a system for protecting electric transformers, especially distribution transformers, which overcomes the disadvantage of known protective systems.

It is a particular object of this invention to provide a protective system for both three-wire and two-wire surge current injection into the low voltage side of the transformer and for protecting such transformers particularly against anomalous failures as described above.

Another object of this invention is to provide a protective system of the above-type utilizing a lightning arrester device arranged external to the transformer tank and mounted on the tank wall adjacent to the secondary X1 and X3 terminals, so that voltage surges are shunted to the grounded tank and, hence, external to the transformers.

Other objects and advantages of the present invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

Figure 1:
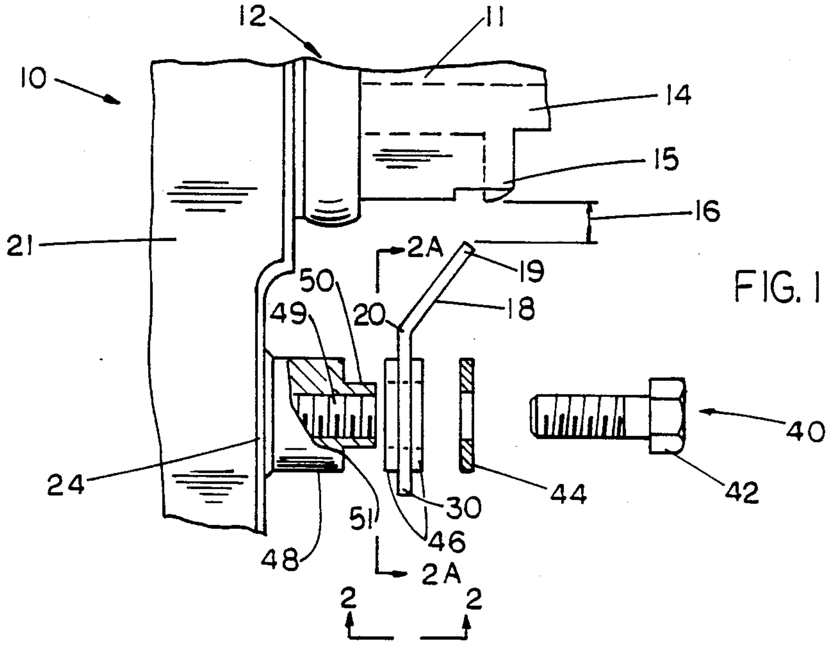
FIG. 1 shows an elevation view, partially exploded, of the surge protection device of the present invention.

Referring initially to FIG. 1, there is shown a two-stage gapped low-voltage bushing arrester 10 generally comprising bushing 12 and arrester assembly 40. Bushing 12 comprises, in general, line potential bushing stud 14, insulator 11, and gap electrode 15. Bushing stud 14 is mounted through wall 24 of pole mount distribution transformer 21 and is made of a conductive material, for example, brass or copper. Insulator 11 insulates bushing stud 14 from transformer wall 24 which is typically formed of a conducting metal. Gap electrode 15, a portion of which extends through insulator 11, is a metallic electrode integrally formed as a portion of bushing stud 14.

Figure 2:
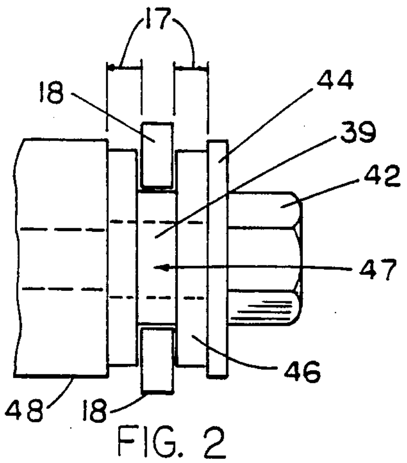
FIG. 2 shows an elevation view of a portion of the surge protection device shown in FIG. 1.
Figure 2A:
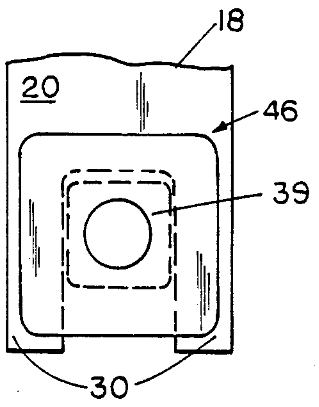
FIG. 2A shows another elevation view of a portion of the surge protection device shown in FIG. 1.

Referring now to FIGS. 1, 2 and 2A, arrester assembly 40 generally comprises a metallic ground pad or weld nut 48, a resistive grommet 46, a metallic washer 44, a metallic bolt 42 and a metallic arc strap 18.

The metallic ground pad or weld nut 48, a ground pad being illustrated in FIG. 1, is affixed, as by welding, to the wall 24 of transformer 21. Ground pad 48 includes an axial tapped bore 49 for threaded engagement with bolt 42. Pad 48 also includes a reduced diameter portion 50 that forms a shoulder 51 upon which grommet 46 bears, as explained below.

Resistive grommet 46 may be made of rubber or other elastomeric material, and is preferably formed of a polydimethylsiloxane elastomer with a high carbon filler. Resistive grommet 46 should have a resistance which is three ohms or less to provide adequate surge protection, and preferably should be less than two ohms. It should also have a resistance of 0.1 ohm or more to assure interruption of power-follow current after a surge. The preferred thickness of grommet 46 when formed of the preferred polydimethlsiloxane elastomer is approximately 0.21 inches in an uncompressed state.

Arc strap 18 is made of a conducting metal, such as stainless steel, brass or copper, and includes a body portion 20 having a pair of legs 30, and a head portion 19. As best shown in FIGS. 2 and 2A, legs 30 of arc strap 18 are clevis shaped for attachment to resistive grommet 46. Resistive grommet 46 is preferably rectangular in shape and has an a rectangular-shaped channel or groove 47 formed in its sides for receiving the legs 30 of arc strap 18. The depth of channel 47 defines a rectangular-shaped core 39, core 39 having dimensions smaller than the overall dimension of grommet 46. Legs 30 straddle the grommet core 39 and are retained within channel 47 in electrical contact with grommet 46.

While arc strap 18 has been described and depicted as including legs 30, arc strap 18 may alternatively include an aperture sized to receive resistive grommet 46. Similarly, grommet 46 may be circular rather than rectangular in shape. In any configuration, arc strap 18 is secured within channel 47 of grommet 46. A bolt 42 and washer 44 secure arc strap 18 and resistive grommet 46 to ground pad 48, the threaded shank portion 43 of bolt 42 extending through the coaxially aligned bores of washer 44, resistive grommet 46 and ground pad 48.

Because of the characteristics of the material from which resistive grommet 46 is made, in order to achieve the proper resistance, it is necessary that a certain amount of compression be placed on resistive grommet 46. It is also important that the grommet 46 not be overcompressed. Accordingly, as shown in FIG. 1, grommet 46 is formed with a central bore having a diameter slightly greater than the diameter of the reduced diameter portion 50 of ground pad 48 such that grommet 46 is slidingly engaged on portion 50 and bears against shoulder 51. The proper compression on grommet 46 is achieved by tightening bolt 42 until the end of portion 50 on ground pad 48 engages the bearing surface of washer 44, thus limiting further compression.

Arc strap 18 is sized such that head portion 19 and gap electrode 15 of bushing 12 are separated by a distance of approximately $\frac{1}{8}$ to $\frac{3}{8}$ inch, that distance forming a first spark gap 16. It is preferred that first spark gap 16 be 3/16 inch. When resistive grommet 46 is properly positioned and compressed on shoulder 51 of ground pad 48, the distance between legs 30 and washer 44, and the distance between legs 30 and shoulder 51 of ground pad 48, will each be approximately 0.04 inch, each of those distances forming second spark gap 17 shown in FIG. 2.

Figure 3:
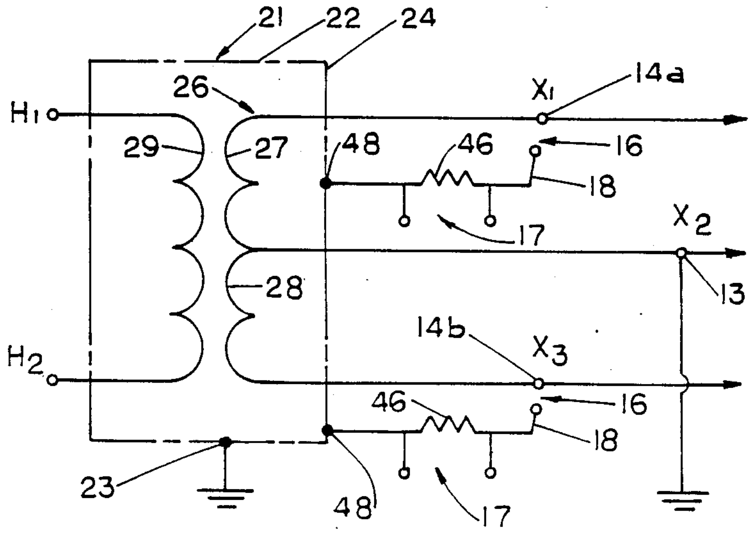
FIG. 3 shows a schematic circuit diagram of the surge protection device shown in FIG. 1.

The operation of the two-stage gapped arrester 10 is best explained with reference to FIG. 3. Referring now to FIG. 3, primary winding 29 and secondary winding 26 of transformer 21 are shown housed in enclosure 22. Transformer 21 includes high voltage or primary bushings $H_1$ and $H_2$, low voltage line potential bushings X1 and X3, and neutral bushing X2. Secondary winding 26 includes two winding sections 27 and 28, one end of each section 27 and 28 being interconnected and grounded through neutral bushing stud 13 of neutral bushing X2. The ungrounded ends of secondary winding sections 27 and 28 are connected to line potential bushing studs 14*a*, 14*b* of the X1 and X3 bushings respectively.

In operation, when primary winding 29 of transformer 21 is energized, a designed potential difference is created between neutral bushing stud 13 and line potential bushing studs 14*a*, 14*b*, such potential difference typically equal to a nominal voltage of 120 volts. When a current surge occurs on the low-voltage or secondary windings 26, as may typically occur due to a lightning strike, for example, a transient overvoltage is induced which will appear between line potential bushing studs 14*a* or 14*b* (or both) and grounded neutral bushing stud 13. This will induce an overvoltage condition of proportionately greater magnitude within primary winding 29 which, if allowed to persist, could damage or destroy the transformer. If the secondary side transient voltage is sufficiently high, the air within first spark gap 16 becomes ionized and first spark gap 16 will flash over, thereby forming a conductive path in parallel with a section 27 or 28 of winding 26, the parallel conductive path being formed by the series combination of first spark gap 16, arc strap 18, resistive grommet 46 and ground pad 48. This conductive path thus conducts the transient surge current between line potential bushing stud 14 and ground via arc strap 18, resistive grommet 46 and ground pad 48, which is electrically connected to wall 24 of transformer housing 22 which is, in turn, grounded as at 23. As the transient dissipates, the series resistance provided by grommet 46 will limit the power-follow current causing the arc across first spark gap 16 to extinguish within the first current zero, thus returning the system to its steady-state operational mode.

With a first spark gap 16 of approximately 3/16 inch and a resistive grommet 46 having resistance of between 0.1 and 2 ohms, first spark gap 16 should flash over at approximately 8 to 12 KV. With the secondary side surge current thus shunted outside the transformer secondary winding 26 by arrester assembly 40, the magnetic field, and hence the voltage induced within the primary winding 29, is collapsed so as to result in no damage to the primary winding 29. At higher magnitude surge currents, such as when currents exceeding 2,000 amps are conducted through either half of the secondary winding, the voltage appearing across resistive grommet 46 as a result of the surge current being conducted therethrough will be sufficient to cause second spark gaps 17 to flash over, thereby shunting surge current around resistive grommet 46 to quickly dissipate the surge energy before any damage can occur. As the transient dissipates, the voltage across resistive grommet 46 will decrease until the arc across second spark gap 17 is extinguished as the surge current again flows through resistive grommet 46. Thereafter, the resistance provided by grommet 46, which again forms part of the conductive path, will limit the power-follow current causing the arc across first spark gap 16 to extinguish within the first current zero. Spark over at gap 17 may include spark over between arc strap 18 and washer 44, or between arc strap 18 and ground pad 48, or both. It is to be understood, of course, that the thickness of grommet 46 may be increased so as to increase the spark over voltage at second spark gap 17.

The two stage gapped arrester 10 provides a reliable and inexpensive means for protecting distribution transformers from damage due to secondary side surge current injection. Arrester 10 provides tighter clamping of high energy surges than conventional MOV arresters and is much less expensive to manufacture. Further, arrester 10 is simple to install and since it is mounted external to transformer tank wall 24, it is visible to workers and easily accessible.

FIGS. 4 through 10A show alternative embodiments of the present invention and other means of limiting the compression of resistive grommet 46. Throughout the remaining Figures, wherever possible, like or similar numerals will refer to like or similar parts previously described.

Figure 4:
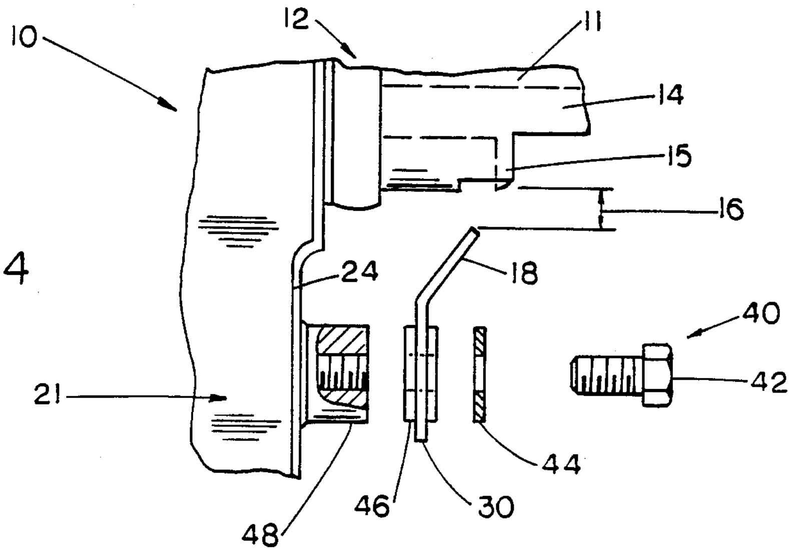
FIG. 4 shows an elevation view, partially exploded, of an alternative embodiment of the surge protection device shown in FIG. 1.

Referring now to FIG. 4, there is shown ground pad 48 constructed without reduced diameter portion 50 such that the length of shank portion 43 of bolt 42 itself limits the compression on grommet 46 as the end of shank 43 contacts wall 24 of transformer 21. In this configuration, transformer wall 24 and the height of ground pad 48 serve as the limit of travel of bolt 42, thus compressing the grommet 46 a predetermined amount between the face of pad 48 and the bearing surface of washer 44.

Figure 5:
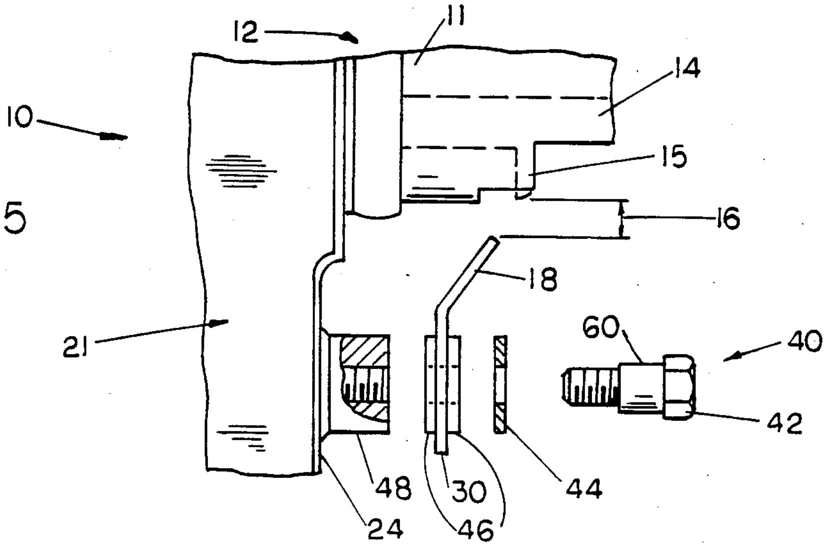
FIG. 5 shows an elevation view, partially exploded, of an alternative embodiment of the surge protection device shown in FIG. 4.

In the alternative embodiment as shown in FIG. 5, a shoulder 60 is formed on bolt 42 to limit travel of bolt 42 into tapped bore 49 of ground pad 48, shoulder 60 thus serving as a grommet compression limiter.

Figure 6:
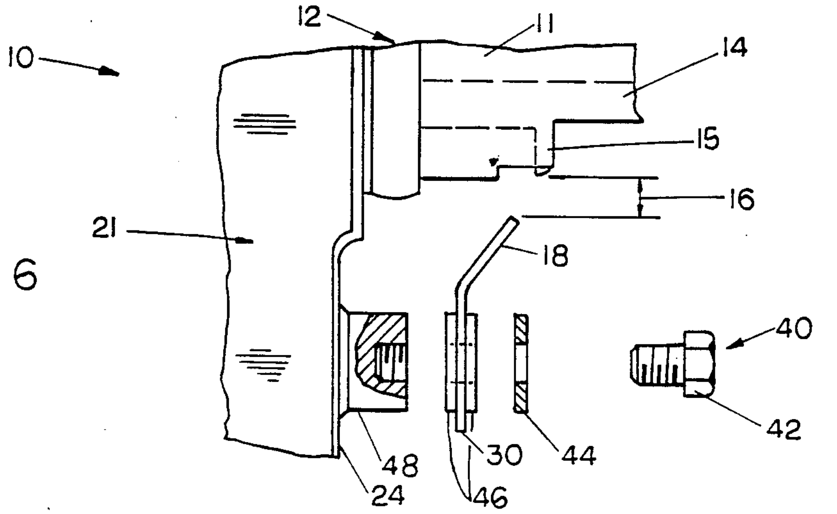
FIG. 6 shows an elevation view, partially exploded, of another alternative embodiment of the surge protection device shown in FIG. 4.

Another alternative embodiment is shown in FIG. 6. In this embodiment, the depth of tapped bore 49 in ground pad 48 does not extend completely through ground pad 48. This feature, in combination with the length of the shank 43 of bolt 42, limits the travel of bolt 42 into bore 49 and, hence, limits the compression of grommet 46.

Figure 7:
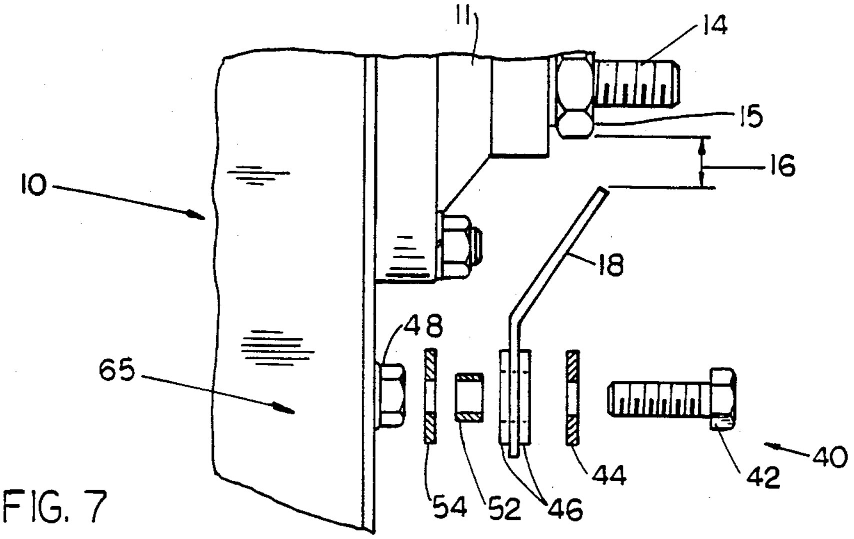
FIG. 7 shows an elevation view, partially exploded, of a further embodiment of the surge protection device shown in FIG. 1.
Figure 8:
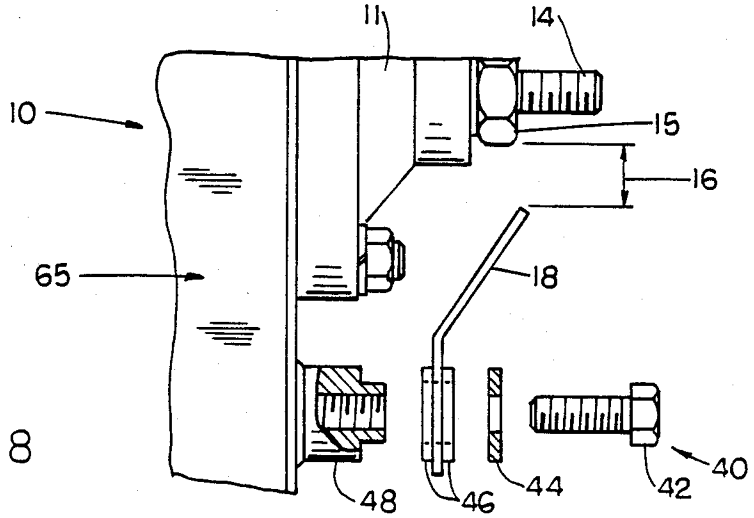
FIG. 8 shows an elevation view, partially exploded, of another alternative embodiment of the surge protection device shown in FIG. 1.
Figure 9:
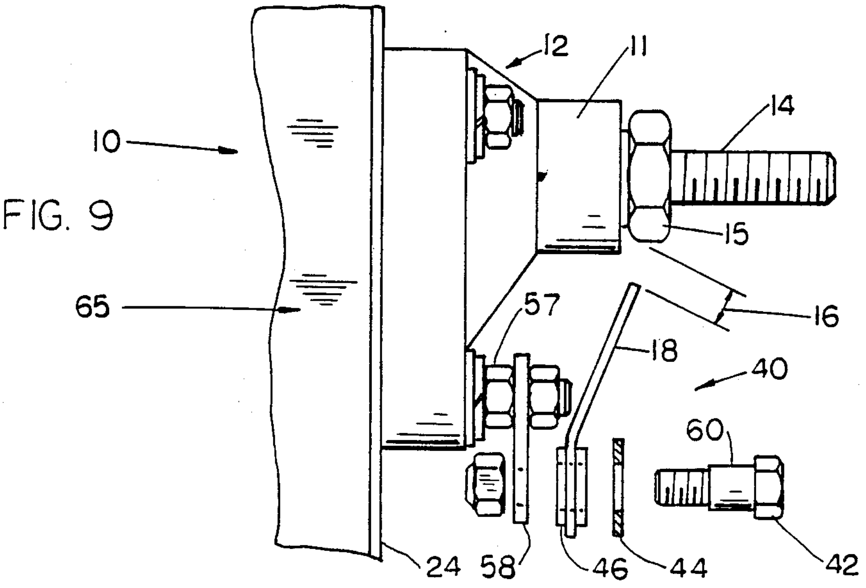
FIG. 9 shows an elevation view, partially exploded, of another alternative embodiment of the surge protection device shown in FIG. 1.
Figure 9A:
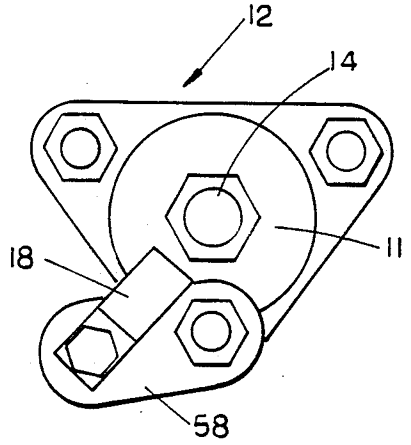
FIG. 9A shows an elevation view of the surge protection device shown in FIG. 9.

Referring now to FIGS. 7, 8 and 9, there is shown a surge arrester 10 of the present invention as applied to a pad mount distribution transformer 65. The alternative embodiment illustrated in FIG. 7 includes a metallic spacer 52 in cooperation with a washer 54 disposed between ground nut 48 and grommet 46. The spacer 52 limits the compression on resistive grommet 46 when bolt 42 is threaded into ground nut 48. Referring to FIG. 8, the arrester assembly 40 and means for limiting compression on resistive grommet 46 previously shown with respect to a pole mount distribution transformer 21, as shown in FIG. 1, is shown for use with a pad mount distribution transformer 65. The alternate embodiment shown in FIGS. 9 and 9A includes extension arm 58. Arm 58 is formed of a conducting metal and is secured at one end to grounded fastener 57, which is employed to secure bushing 12 to pad mount distribution transformer 65. Shoulder 60 on bolt 42 serves a compression limiter as it engages the facing surface of arm 58. As can be seen best in FIG. 9A, arm 58 allows for the adjustment of arc strap 18 and the setting of first spark gap 16 when arrester assembly 40 is installed.

Figure 10:
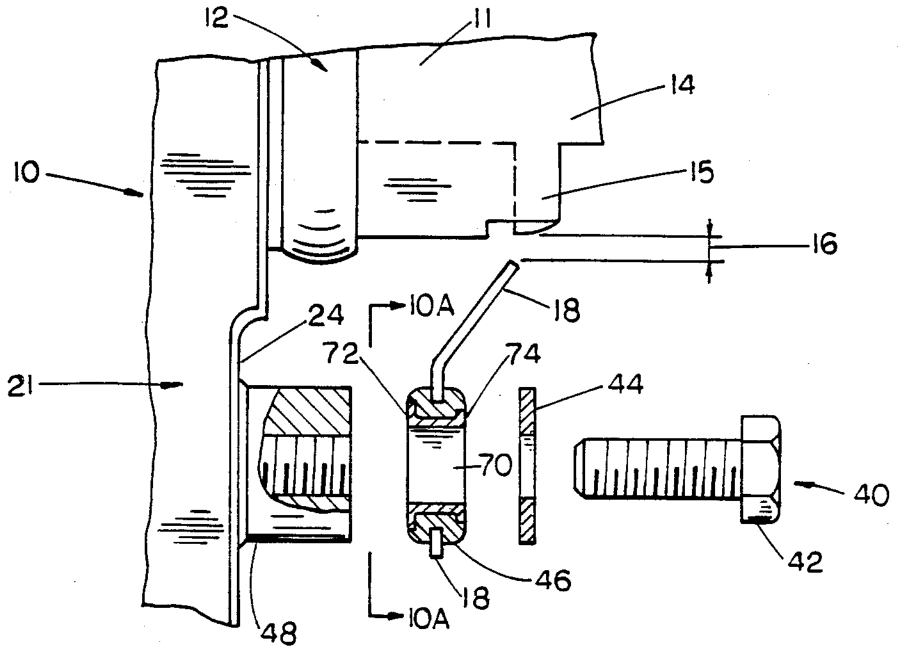
FIG. 10 shows an elevation view, partially exploded and partially in cross section, of the surge protection device shown in FIG. 1.
Figure 10A:
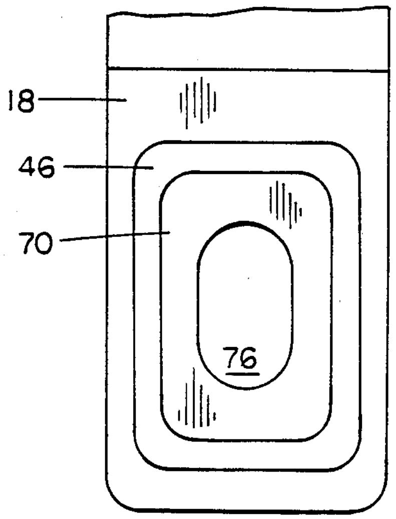
FIG. 10A shows an elevation view of a portion of the surge protection device shown in FIG. 10.

Referring now to FIGS. 10 and 10A, there is shown another alternative embodiment of the present invention and means for limiting compression of resistive grommet 46. As best shown in FIG. 10, arrester assembly 40 includes metallic eyelet 70 which preferably is formed of stainless steel. Eyelet 70 includes long and short flanges 72 and 74, respectively, and a generally oval-shaped bore 76. In this embodiment, arc strap 18 is formed without legs 30, arc strap 18 instead including a generally rectangular shaped aperture 78 formed and sized so as to allow insertion of the short flange 74 of eyelet 70 therethrough. Molded between eyelet 70 and arc strap 18 is resistive grommet 46. In this configuration, eyelet 70, arc strap 18 and resistive grommet 46 together form a single composite gap assembly 80. Gap assembly 80 is secured to ground pad 48 by washer 44 and bolt 42 with eyelet 70 serving to limit compression on resistive grommet 46. A second spark gap 17 is formed between arc strap 18 and washer 44, and between arc strap 18 and ground pad 48.

While a preferred embodiment of the invention has been shown and described, modifications thereof can be made by one skilled in the art without departing from the spirit of the invention.

What is claimed is:

1. A surge protector, comprising:

a transformer secondary winding; and means for reducing the voltage across a section of said winding, said voltage reducing means including a first spark gap and an elastomeric resistor in series with said first spark gap, said resistor and said first spark gap forming a conductive path, wherein said conductive path is electrically connected in parallel with a section of said winding and includes means for shunting current in said conductive path around said series resistor, said shunting means comprising a second spark gap in parallel with said series resistor.

2. The surge protector of claim 1 wherein said voltage reducing means shunts current through said conductive path at a voltage across said winding section that exceeds 7 KV.

3. The surge protector of claim 1 wherein said resistor has a resistance within the range of 0.1 to 3.0 ohms.

4. The surge protector of claim 1 wherein said first spark gap is within the range of ⅛ to ⅜ inches.

5. A surge arrester comprising:

a transformer secondary winding section;

a terminal electrically connected to said secondary winding section; and a gapped arrester assembly in parallel with said secondary winding section, said arrester assembly comprising:

a first spark gap adjacent said terminal;

a resistive element in series with said first spark gap, said spark gap and said resistive element forming a conductive path for surge current; and a second spark gap in parallel with said resistive element for shunting surge current in said conductive path around said resistive element.

6. The surge arrester of claim 5 wherein said first spark gap will spark over at a voltage above 7 KV.

7. The surge arrester of claim 5 wherein said second spark gap will spark over when surge currents exceeding 2,000 amps are injected into said secondary winding section.

8. The surge arrester of claim 5 further comprising an arc strap electrically in series with said resistive element, said arc strap comprising a first end adjacent to said terminal and forming said first spark gap therebetween.

9. The surge arrester of claim 8 wherein said resistive element comprises a grommet, said grommet including a core portion having an axial bore formed therethrough and including a pair of flanges formed on said core portion, said flanges defining a channel therebetween.

10. The surge arrester of claim 9 wherein said arc strap further comprises spaced apart legs disposed in said channel of said flanged grommet, said core portion of said grommet being received between said legs and in electrical contact therewith.

11. The surge arrester of claim 10 further comprising:

a housing for enclosing section;

a ground pad attached to said housing; and a metallic fastener disposed between said arc strap legs and through said axial bore of said resistive grommet, said fastener making electrical connection with said resistive grommet and said ground pad forming a series path for current from said arc strap through said grommet and said fastener to said ground pad.

12. The surge protector of claim 5 wherein said resistive element has a resistance of at least 0.1 ohms.

13. The surge protector of claim 5 wherein said resistive element has a resistance less than or equal to 3.0 ohms.

14. The surge protector of claim 8 wherein said resistive element has a resistance less than 2.0 ohms and is formed from an elastomer having a high carbon filler.

15. The surge protector of claim 8 wherein said first spark gap is within the range of ⅛ to ⅜ inches.

16. A surge arrester, comprising:

a distribution transformer having a low voltage secondary winding and a metallic enclosure;

a line potential terminal electrically connected to said secondary winding and electrically insulated from said metallic enclosure;

an arc strap, said arc strap including a first end adjacent to said terminal forming a first spark gap therebetween, and including a second end including leg portions formed thereon;

a resistive grommet having an axial bore therethrough and a core portion engaged between said legs of said arc strap, said legs and said grommet forming a conductive path; and means for electrically connecting said resistive grommet to said enclosure.

17. The surge arrester of claim 16 wherein said connecting means comprises a metallic fastener including a shank portion disposed between said arc strap legs and through said axial bore of said resistive grommet and making electrical contact with said resistive grommet and said enclosure.

18. The surge arrester of claim 17 further comprising means for shunting current around said resistive grommet.

19. The surge arrester of claim 18 wherein said shunting means includes a second spark gap.

20. The surge arrester of claim 19 wherein said secondary spark gap is formed by the conducting surfaces of said arc strap and said fastener.

21. The surge arrester of claim 16 wherein said grommet is elastomeric and is compressed by said connecting means.

22. The surge arrester of claim 16 wherein said grommet has a resistance within the range of 0.1 to 3.0 ohms.

23. The surge arrester of claim 16 wherein said connecting means forms a secondary spark gap electrically in parallel with said resistive grommet.

24. The surge arrester of claim 16 wherein said first spark gap is within the range of $\frac{1}{8}$ to $\frac{3}{8}$ inches.

25. A surge protector, comprising:

a conductive arc strap having spaced apart legs; and a resistive grommet having a core portion and an axial bore formed therethrough, said core portion being engaged between said legs and in electrical contact therewith, said arc strap and said grommet forming a conductive path.

26. The surge protector of claim 25 wherein said grommet has a resistance of from 0.1 to 3.0 ohms.

27. The surge protector of claim 25 wherein said grommet is made of an elastomer.

28. The surge protector of claim 25 wherein said grommet is made of polydimethylsiloxane elastomer.

29. The surge arrester of claim 25 wherein said arc strap and said grommet are secured in electrical contact by a conductive fastener, said fastener including a shank portion and a flanged portion, said shank portion disposed between said arc strap legs and through said axial bore of said grommet.

30. The surge protector of claim 29 wherein said arc strap legs and said flanged portion of said fastener form a spark gap in parallel with said grommet.

31. A surge protector, comprising:

a conductive arc strap having an aperture formed therein;

a metallic eyelet disposed within said aperture; and means for securing said eyelet within said aperture, said securing means forming a series resistance between said arc strap and said eyelet.

32. The surge protector of claim 31 wherein said securing means comprises an elastomeric material.

33. The surge protector of claim 31 further comprising at least one spark gap in parallel with said series resistance.

* * * * *